Dec. 15, 1970   W. H. WOODWARD   3,546,865
ASPARAGUS HARVESTER
Filed May 9, 1968   3 Sheets-Sheet 1
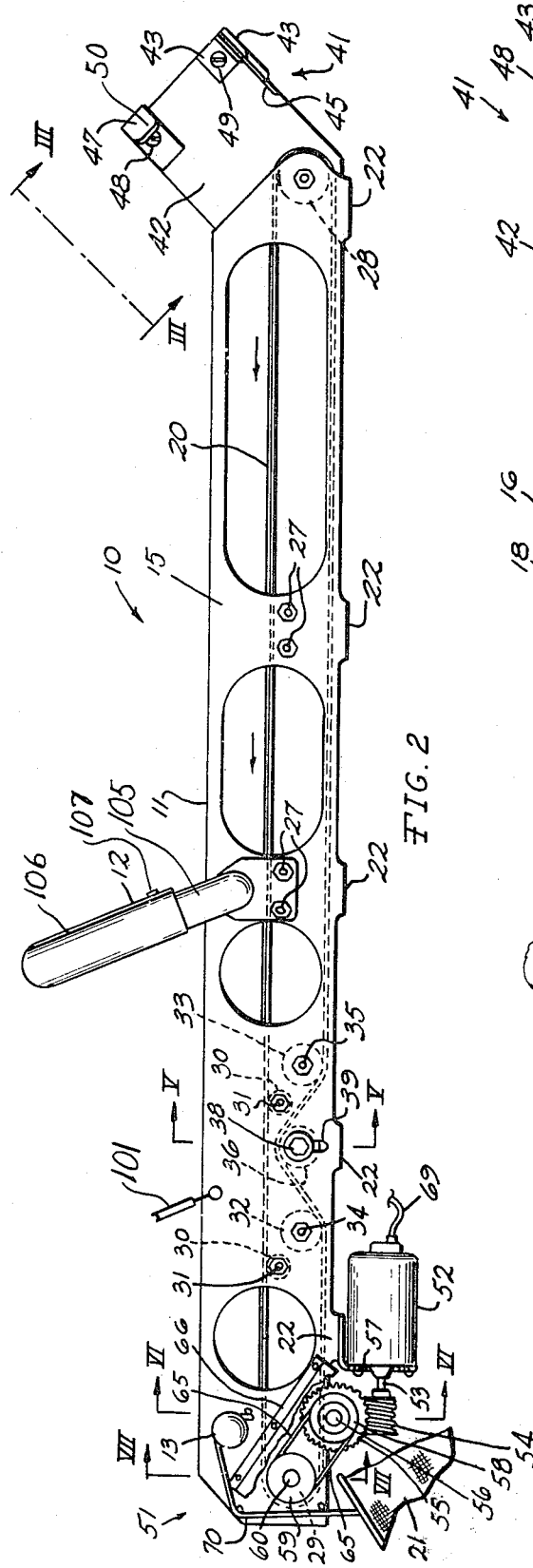
INVENTOR
WILLIAM H. WOODWARD
BY
Roy A. Plant
ATTORNEY

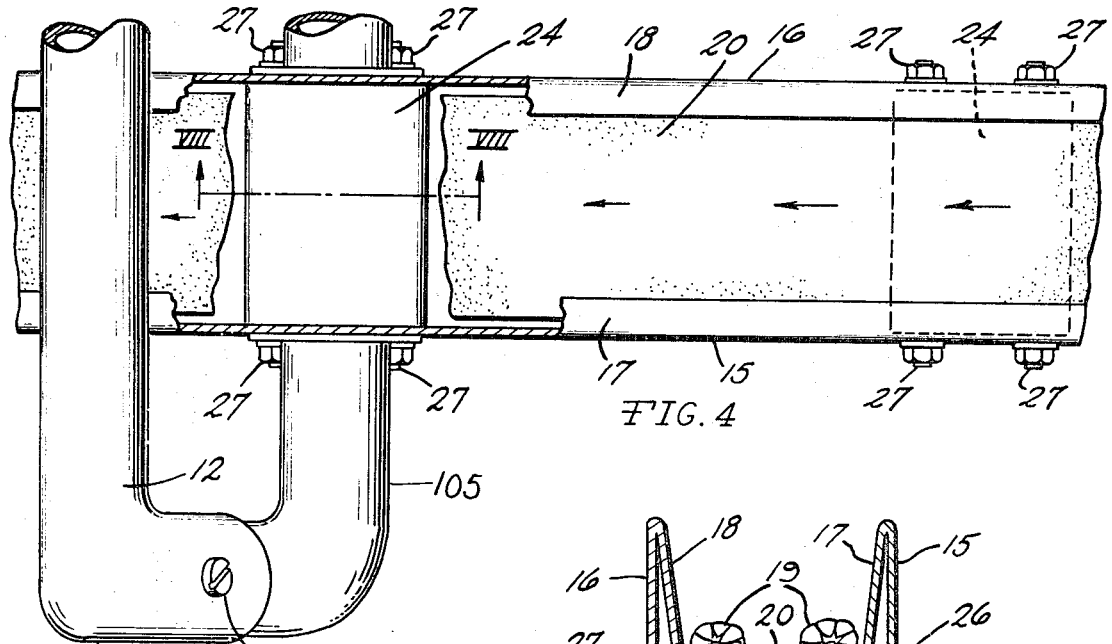
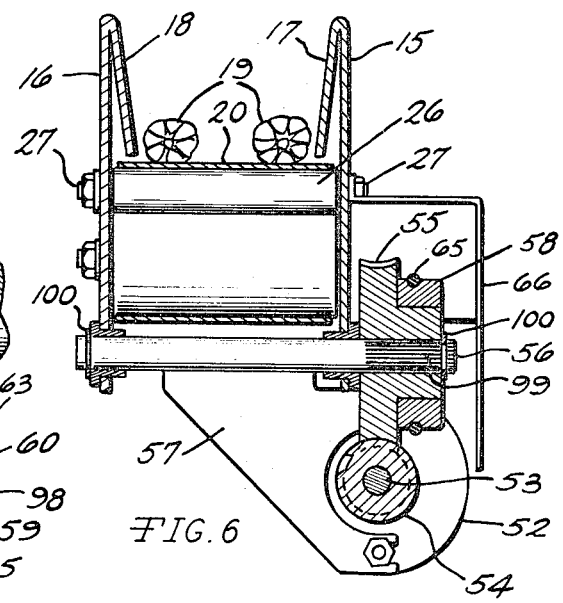
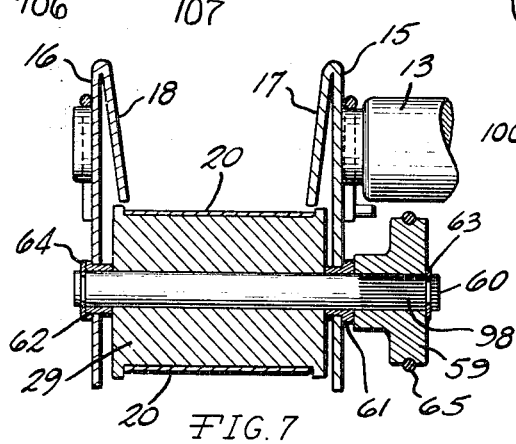
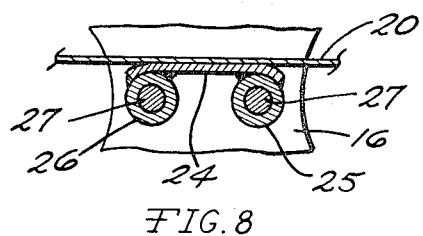
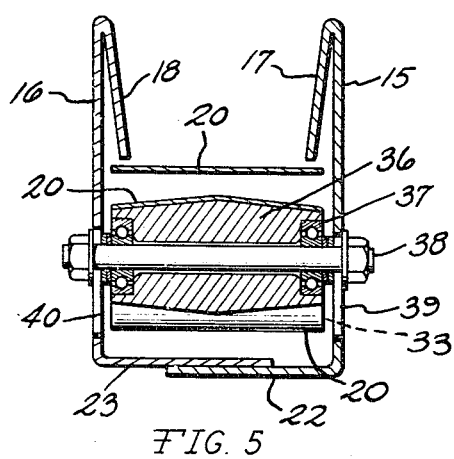
INVENTOR
WILLIAM H. WOODWARD
BY *Roy A. Plant*
ATTORNEY

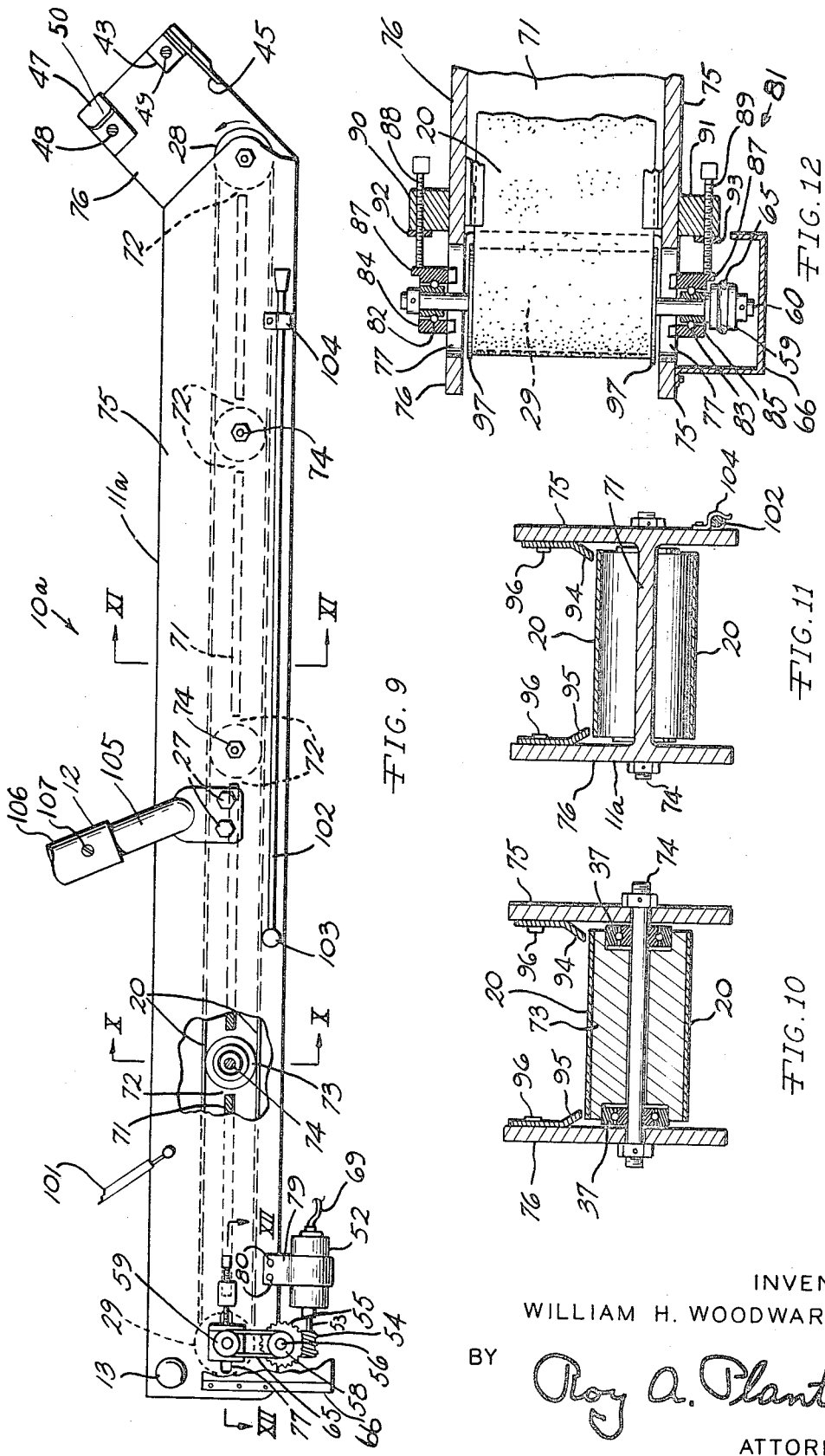

3,546,865
ASPARAGUS HARVESTER
William H. Woodward, Ottawa, Ill.; Phyllis M. Woodward, executor of said William H. Woodward, deceased
Filed May 9, 1968, Ser. No. 727,995
Int. Cl. A01d 45/00
U.S. Cl. 56—327                                        20 Claims

ABSTRACT OF THE DISCLOSURE

The present device is a manually carried machine, having a motor and power driven belt, for use in harvesting above ground growing vegetables such as asparagus spears, and elevating same to a receiver. At the forward end of the machine, the frame of same is provided with a relatively narrow side opening just forward of the end of said belt for sidewise receiving growing asparagus spears, while forward of said belt and side opening and crosswise of said frame there is provided a cutting blade, substantially parallel to the ground when the harvester is in use, with the cutting edge of the blade facing the end of said belt and varying from substantially parallel to the end of said belt to forwardly inclined away from said belt and side opening, so that with an asparagus spear received through said side opening, a backward motion of said machine will sever the asparagus spear and cause same to fall onto said belt for elevation to a receiver.

BACKGROUND OF THE INVENTION

The present invention relates broadly to produce harvesting machines, and in its more specific phases to a manually carried, power driven, harvester for green or above ground asparagus and similar growing vegetables.

Asparagus is a very tender vegetable which is easily injured so as to have an undesirable appearance for sale in bundles to the housewife in vegetable markets or the vegetable department of grocery stores. Moreover, asparagus plants are planted in rather wide, elevated rows, and the spears to be harvested emerge from the ground at varying spacing and angles, and in the harvest season, between harvesting times which are normally on alternate days, grow at varying rates as well as in different diameters. This makes it substantially impossible to harvest same without loss, by means of previously proposed wheel mounted devices similar to mowing machines and converted cultivators or tractors. Many efforts have been made to invent such machines, with those devised for this purpose being generally of very complex construction, some of which have sensing devices to contact or spot with an electric eye a spear to be cut, and then cut same, grasp it and carry same to a point of delivery.

The above procedures apparently have not been commercially successful since the general, and substantially universal, practice in the past and currently followed is to utilize so-called "stoop labor" to harvest the asparagus spears by hand with a sharp knife. This is a back-breaking and tedious operation commonly handled by imported Mexican, Jamaican, Puerto Rican or like labor who are familiar with and normally do this kind of work in their home countries.

In an effort to make more work available to United States citizens the government has been limiting the amount of this "stoop labor" which can be imported, only to find that most United States citizens refuse to do this kind of seasonal work. To meet this situation it is desirable to improve the asparagus harvesting devices and methods, while recognizing that individual spear cutting is necessary, so as to eliminate the need of "stoop labor" and at the same time drastically increase the amount of asparagus which each worker can harvest in a day's time. It was a recognition of this problem and the complete lack of a current commercially successful solution to same, which led to the conception and development of the present invention.

SUMMARY OF THE INVENTION

Accordingly, among the objects of the present invention is the provision of a manually carryable, power driven harvester for asparagus, and an improved method of using same for the harvesting of asparagus.

Another object is to provide an asparagus harvester which cuts one asparagus spear at a time by a sidewise hooking followed by a pulling or hoeing motion.

Another object is to provide an asparagus harvester having a conveyor for receiving the cut asparagus spears and transporting same from the point of cutting to an elevated receiver.

Another object is to provide a quick detachable and attachable asparagus spear receiver for an asparagus harvester.

Another object is to provide an asparagus harvester supplied with a shoulder harness for partially or wholly supporting same under conditions of use.

Another object is to provide an asparagus harvester with a foldable supporting leg assembly so that same can be self-supporting between times of use.

Still another object is to provide an asparagus harvester with an adjustable mid-length operating handle, to facilitate use by laborers of different heights.

Still further objects and advantages of the invention will appear as the description proceeds.

To the accomplishment of the foregoing and related ends, the invention, then, consists of the means and method hereinafter fully described and particularly pointed out in the claims, the annexed drawings and the following description setting forth in detail certain means and modes of carrying out the invention, such disclosed means and modes illustrating, however, but several of the various ways in which the principle of the invention may be used.

BRIEF DESCRIPTION OF DRAWINGS

In the annexed drawings:

FIG. 1 shows a diagrammatic side elevational view of an asparagus harvester of the present invention under conditions of use.

FIG. 2 shows an enlarged assembly side elevational view of one form of the asparagus harvester shown in FIG. 1, with certain parts of same broken away and others shown in dashed lines to better illustrate one type of construction of same.

FIG. 3 is a top view showing a fragmentary enlarged portion of the asparagus spear cutting end of the harvest as seen along line III—III of FIG. 2, looking in the direction of the arrows.

FIG. 4 is a fragmentary, partially sectioned. enlarged portion of the asparagus harvester as seen from the top at the point of mounting the mid-length supporting handle.

FIG. 5 is a sectional view of the belt take-up assembly as taken along line V—V of FIG. 2, looking in the direction of the arrows.

FIG. 6 is a sectional view as taken along line VI—VI of FIG. 2, looking in the direction of the arrows.

FIG. 7 is a sectional view as taken along line VII—VII of FIG. 2, looking in the direction of the arrows.

FIG. 8 is a sectional view as taken along line VIII—VIII of FIG. 4, looking in the direction of the arrows.

FIG. 9 shows an enlarged assembly side elevational view of another form of the asparagus harvester of FIG. 1, with certain of the parts of same broken away and others shown in dashed lines to better illustrate this modified form of the present invention.

FIG. 10 is a sectional view as taken along line X—X of FIG. 9, looking in the direction of the arrows.

FIG. 11 is a sectional view as taken along line XI—XI of FIG. 9, looking in the direction of the arrows.

FIG. 12 is a sectional view of one typical form of mechanism for adjusting the position of the upper end roller for tightening the conveyor belt, as taken along line XII—XII of FIG. 9, looking in the direction of the arrows.

DESCRIPTION OF SPECIFIC EMBODIMENTS

Referring more particularly to FIGS. 1 and 2, it will be noted that the asparagus harvester 10 has an elongated, light-weight construction, body portion 11 with a mid-length operating handle 12 and a reversible side upper end operating handle 13 so that the laborer 14 (either right-handed or left-handed) can readily support and guide the harvester 10 under conditions of use.

The elongated body portion 11, in one form of the harvester assembly 10, has light-weight metal side members 15 and 16 formed from sheet metal, with respective upper inturned guide member portions 17 and 18 which hold the cut asparagus spears 19 in the central portion of conveyor belt 20 as they are being elevated to the receiver 21.

Side members 15 and 16 preferably have a series of inturned stabilizing bottom members 22 and 23, FIGS. 2 and 5, fixedly joined together in conventional manner such as by welding, brazing, riveting, or bolting, and it is intended that the showing in the drawings be considered as diagrammatically illustrating same. The rigidity of the elongated body portion 11 is also increased by belt support members 24, FIGS. 2, 4 and 8, which have substantially parallel tubular members 25 and 26 through which extend bolts 27, preferably made of magnesium or aluminum for lightness, the tightening of which stabilizes the position of side members 15 and 16 so that the elongated, light metal, body portion 11 forms the frame of the harvester assembly 10. As shown in FIGS. 2, 4 and 8, one pair of the bolts 27 anchor the mid-length operating handle 12 to the elongated body portion or frame 11.

The belt 20, which is reinforced so as to be stretch resistant, is also non-slippery to facilitate driving as well as minimizing slipping of asparagus being elevated by same, passes around end rollers 28 and 29 which preferably are of light-weight metal and have end flanges 97 for guiding and positioning said belt between side members 15 and 16. If desired, an additional pair of light-weight support rollers 30, FIG. 2, may be provied for belt 20, with such rollers being preferably provided with ball or roller bearings for reduced friction. These rollers 30 are supported on bolts 31 in conventional manner.

It is necessary to provide means for taking up slack in belt 20 and one such take-up means is shown in FIGS. 2 and 5, where there is illustrated a pair of idler rollers 32 and 33 mounted on bolts 34 and 35 preferably by means of ball or roller bearings for reduced friction. Between these idler rollers 32 and 33 is mounted a light-weight take-up roller 36 preferably utilizing a ball bearing mounting 37 for reduced friction on mounting bolt 38. Side members 15 and 16 are provided with slots 39 and 40 so that by loosening bolt 38, take-up roller 36 may be shifted with bolt 38 lengthwise of slots 39 and 40 for suitably tightening belt 20. Roller 36 may be moderately crowned. FIG. 5, to help center belt 20 on the respective pulleys over which it passes under conditions of operation.

The lower end of the harvester 10, as seen in FIG. 1, carries the asparagus cutting assembly 41 which cuts the asparagus spears 19 close to the ground. This assembly 41 preferably includes an extension 42 of side member 16 with an inturned end portion 43 substantially parallel to the ground, FIGS. 1 and 2, with quick detachable anchor means 44 for a cutting blade 45. This blade preferably angles away from the opening 46 which receives the asparagus spear to be severed. By angling the cutting blade 45 forward away from opening 46 from a minimum of parallel to the end of belt 20, FIG. 3, the cut spears of asparagus 19, which are normally eight to twelve inches long, will fall as cut onto the belt 20 for the elevation of same to the asparagus receiver 21.

Where an asparagus spear 19 to be severed leans to the right, FIG. 1, it is preferable to supply extension 42 with an asparagus spear support member 47 having an inturned outer end 50, as shown in FIG. 3, to make sure that the asparagus spear 19, even under adverse conditions, falls backward properly for elevation by belt 20. A small bolt 48 may be used to anchor support member 47 in place as shown. Blade 45 may likewise be supported on a bracket such as the turned-in end portion 43, FIG. 2, with same anchored in place with a small bolt 49.

Referring to FIGS. 1, 2 and 6, the upper end portion of the asparagus harvester 10, which carries operating handle 13, has the power drive assembly 51 which preferably includes an electric motor 52, the shaft 53 of which has mounted thereon a worm drive pinion 54 in mesh with a worm gear 55 mounted as by feather keying 99 on shaft 56 conventionally supported rotatably on frame 11 and held with snap rings 100. Electric motor 52 is mounted on a bracket 57 which, in turn, is conventionally joined to frame 11, preferably at the upper inturned bottom stabilizing member 22, FIG. 2. Fastened on the side of worm gear 55 by press fitting or the like on shaft 56 is a pulley 58 in line with pulley 59, FIGS. 2 and 7, conventionally anchored on shaft 60 as by means of feather keying 98, to which, in turn, is conventionally anchored belt end roller 29 for driving belt 20. Shaft 60 may be carried on any suitable anti-friction type bearings and it is intended that the nylon bearings 61 and 62, FIG. 7, be considered as diagrammatically showing same. Snap rings 63 and 64 fitting corresponding grooves in shaft 60 are used to hold same in operating position. An O-ring 65 fitting the alined grooves in pulleys 58 and 59 provide the driving connection between electric motor 52 and belt 20. A protective guard 66, FIGS. 2 and 6, is preferably used to cover the worm gear and belt drive mechanism as a safety measure.

A convenient portable means for supplying power to electric motor 52 is a battery 67, FIG. 1, supported by a shoulder strap carrier 68 with a wire connection 69 which may have an electric switch (not shown) incorporated in same. Preferably a 12-volt rechargeable battery and a 12-volt D.C. motor may be used, although the invention is not limited to same. Any other suitable source of operating power may be used, and it is intended that the showing of the battery 67 and associated members be considered as diagrammatically illustrating same, including a small gasoline motor connected by a flexible shaft to drive roller 29.

In operation of the asparagus harvester 10 the cutting end of same is moved sidewise at or close to the ground so that the asparagus spear 19 to be cut passes through opening 46 in front of cutting knife 45, whereupon the assembly is pulled backward with a hoeing type motion so that knife 45 will sever the asparagus spear which will fall backward onto belt 20 which in turn will carry same upward and deliver it into asparagus receiver 21 conventionally mounted on support 70, FIG. 2. When this receiver is substantially full, it is unhooked and replaced with an empty receiver and the cutting and filling operation continued as before, all of which facilitates rapidly engaging and cutting prechosen individual asparagus spears of mature cutting size, while avoiding the disliked stoop labor cutting procedure.

In operating the machine as described above, it must be realized that laborers using the harvester vary in height over a considerable range. This makes it necessary to make mid-length operating handle adjustable to compensate for this if stooping by a tall laborer is to be avoided. One solution to this problem is diagrammatically shown in FIGS. 1, 2, 4 and 9, where handle 12 is of telescopable type. Here handle mounting portion 105 telescopically fits into handle gripping portion 106 with the two being anchorable together in adjusted position by means of a set screw 107 or any other suitable equivalent means.

A modified form of the invention is shown in FIG. 9 where the frame 11a is preferably in the form of an H-beam of light metal, such as a magnesium or aluminum structural alloy, with the center cross web 71 having cut-out portions 72 at intervals to permit insertion of belt support rollers 73, FIGS. 9 and 10, mounted on a shaft 74, and utilizing anti-friction bearings such as ball or roller bearings 37. This type of construction permits accurate cross drilling of the H-beam 11a so that the belt support rollers 73 in the final assembly will be mounted in perfect alinement for efficient operation requiring a minimum amount of power for driving belt 20. The ends of the H-beam 11a have the cross web 71 cut out to receive end rollers 28 and 29. End roller 28 is preferably constructed and mounted in similar manner to belt support roller 73, FIG. 10, while end roller 29 is preferably of like construction, except that side members 75 and 76 of the H-beam frame 11a are provided with lengthwise parallel slots 77 substantially in alinement with cross web 71 so that end roller 29 mounted on shaft 60 may be moved lengthwise of frame 11a for adjusting the tightness of belt 20. By positioning pulleys 58 and 59 carrying O-ring belt 65, as shown in FIG. 9, back and forth adjustment of the position of roller 29 to tighten belt 20 will have no detrimental effect on the drive mechanism since O-ring 65, is conventionally made of tough stretchable rubber, and will moderately stretch to compensate for the endwise adjustment of the position of roller 29.

Motor 52, FIG. 9, is mounted on frame 11a by means of a bracket 79 and screws 80, and receives its operating power through wire connection 69. Shaft 53 of motor 52 carries on its end a worm pinion 54 in mesh with a worm gear 55, which, in turn, carries pulley 58 in alinement with pulley 59 on shaft 60 which is adjustably movable lengthwise of slots 77 and anchorable in place in conventional manner in adjusted position, as will be hereinafter described in detail.

The asparagus cutting end of frame 11a, FIG. 9, is constructed substantially the same as illustrated in FIG. 3, except that the extending side member 76 of H-beam 71 forms the support for the cutting blade assembly and support member 47 when same is used.

Conveyor belt 20 must be kept sufficiently tight for roller 29, FIG. 12, to drive same under conditions of operation. This roller is preferably provided with an anti-skid surface, such as by knurling, coating with a frictional rubber surface material or the equivalent. The roller contacting surface of belt 20 is also of a type, such as of non-slippery rubber, which cooperates with roller 29 in minimizing belt slippage. A preferred form of belt tightening assembly 81 for adjusting the position of roller 29 is diagrammatically shown in FIG. 12, where roller 29 is fixedly anchored on shaft 60 for turning in unison therewith, and that shaft, in turn, is mounted on ball bearings 82 and 83, carried respectively in bearing blocks 84 and 85 which slidably fit slots 77 in side members 76 and 75 of H-beam frame 11a. Bearing blocks 84 and 85 each respectively have ears 86 and 87 for corresponding engagement with adjusting screws 88 and 89. Mounted on the outer sides of side members 76 and 75 of frame member 11a adjacent the end of slots 77 are threaded blocks 90 and 91 for said screws 88 and 89. Threadedly moving screws 88 and 89 in the same direction through blocks 90 and 91 will, through engagement of the screws with ears 86 and 87, move bearing blocks 84 and 85 in slots 77 in corresponding direction and through shaft 60 carried thereby, move roller 29 for corresponding tightening or loosening the tightness of belt 20. After the belt 20 has been appropriately tightened, the tightening of lock nuts 92 and 93 will hold the assembly in this adjusted position until further adjustment is needed.

In order to keep the asparagus spears 19 away from the free edges of belt 20 and better centered on same while being elevated to the asparagus receiver 21, FIG. 1, guide members 94 and 95, FIGS. 10 and 11, may be fastened to the top portion of the inner faces of side members 75 and 76 of H-beam frame 11a. One conventional way of doing this is to use screws or rivets 96, as shown.

To help the laborer 14 support and manipulate the asparagus harvester 10, same may be provided, FIG. 9, with a shoulder supporting harness 101 for adjustably passing over the laborer's shoulder to partially or fully support the harvester as desired. Also, same may be provided with foldable supporting legs 102 utilizing a pivot mounting 103 so that the harvester can be self-supported when desired. A catch 104 may be provided for holding the supporting legs in retracted position between times of use. It is intended that the showing of the supporting shoulder harness 101 and the foldable supporting legs 102 be considered as diagrammatically illustrating the various equivalent forms of these items.

While but two forms of the invention have been shown and described, other equivalent forms will now be apparent to those skilled in the art. Therefore, the embodiments shown in the drawings are merely diagrammatic and for illustrative purposes, and are not intended to limit the spirit and scope of the invention as above described and illustrated in the drawings.

Other modes of applying the principle of my invention may be employed instead of those explained, change being made as regards the means and the method herein disclosed, provided those stated by any of the following claims or their equivalent be employed.

I therefore particularly point out and distinctly claim as my invention:

1. A manually carried, harvester for asparagus spears and similarly harvestable above ground growing vegetables, which comprises in combination
   (a) a frame having substantially parallel side members,
   (b) means for rigidly holding said side members in spaced apart position,
   (c) handle means mounted on said frame for carrying and actuating said harvester,
   (d) roller means rotatably mounted at opposite ends of said frame and between said side members of same,
   (e) an endless belt carried by said roller means with upper and lower runs and movable lengthwise of said frame between said side members and below the top of same,
   (f) power means mounted on said frame and operatively connected for moving said belt continuously around said roller means mounted on,
   (g) means mounted on the end of said frame remote from said handle means and adjacent the ground for cutting asparagus spears and allowing same to fall onto said belt for elevation by same, and (h) a receiver mounted on said frame and positioned to receive and contain asparagus spears discharged by said belt.

2. A manually carried harvester as set forth in claim 1, wherein
(a) said frame has mounted crosswise thereof and connected to said side members between the upper and lower runs of said belt, means for supporting the upper run of said belt between said end rollers.

3. A manually carried harvester as set forth in claim 2, wherein
(a) said means for supporting the upper run of said belt between said end rollers comprises at least one roller.

4. A manually carried harvester as set forth in claim 1, wherein
(a) said power means includes a motor, and means for connecting said motor to drive said roller at the end of said frame remote from that having said cutting means, and
(b) means for actuating said motor.

5. A manually carried harvester as set forth in claim 4, wherein
(a) said means for actuating said motor is a battery.

6. A manually carried harvester as set forth in claim 1, wherein
(a) said frame has incorporated therein as an integral part of said harvester, means for varying the operating tension of said belt to minimize slippage of same under operating conditions.

7. A manually carried harvester for asparagus spears and similarly harvestable above ground growing vegetables, which comprises in combination
(a) a frame having substantially parallel side members with means intermediate of the top and bottom edges of same, which hold same fixedly in operating position,
(b) handle means mounted on said frame for carrying and actuating said harvester,
(c) roller means rotatably mounted at opposite ends of said frame between said side members of same,
(d) an endless belt carried by said roller means, with upper and lower runs, and movable lengthwise of said frame between said side members and below the top of same,
(e) power means mounted on said frame and operatively connected for moving said belt continuously around said roller means,
(f) means having a side opening at the end of said frame remote from said handle means and adjacent the ground for receiving the item to be harvested,
(g) said side opening means having a blade at its forward end with the cutting edge of same facing said belt and substantially parallel to the ground, and variable in position from substantially parallel to the belt end to moderately inclined forward from said side opening and the adjacent end portion of said belt, to the opposite side of said frame, and
(h) a receiver mounted on said frame and positioned to receive and contain said harvested item discharged by said belt,
whereby said cut asparagus spears or other harvested item will fall backward onto said belt rather than sidewise out through said side opening.

8. A manually carried harvester as set forth in claim 7, wherein the method of operating same comprises
(a) passing the end of said harvester sidewise close to the ground so that said growing asparagus spear to be harvested passes sidewise through said side opening of said means on the lower end of said harvester,
(b) with said asparagus spear thus received, moving said harvester backward sufficiently for said blade to sever same, and (c) elevating said cut asparagus spear on said belt and delivering same into a receiver.

9. A manually carried harvester as set forth in claim 7, wherein
(a) said frame which has substantially parallel side members, is in the form of an H-beam with portions of the cross web of same removed to provide openings for the mounting of belt carrying roller assemblies.

10. A manually carried harvester as set forth in claim 9, wherein,
(a) said frame has mounted crosswise thereof and connected to said side members at said web cut-out points, at least one belt carrying roller assembly between said roller means at opposite ends of said frame for supporting the upper run of said belt.

11. A manually carried harvester as set forth in claim 7, wherein
(a) said power means includes a motor, means for connecting said motor to drive said roller at the end of said frame remote from that having said cutting means, and
(b) means for actuating said motor.

12. A manually carried harvester as set forth in claim 11, wherein
(a) said means for actuating said motor is a battery.

13. A manually carried harvester as set forth in claim 7, wherein
(a) said frame has incorporated therein as an integral part of said harvester, means for varying the operating tension of said belt to minimize slippage of same under operating conditions.

14. A manually carried harvester as set forth in claim 1, wherein
(a) said handle means comprises an end handle and a substantially mid-length handle mounted on said frame,
(b) adjustable means in said mid-length handle for varying the length of said handle to facilitate use of the harvester by different height people, and
(c) means for anchoring said mid-length handle in adjusted position.

15. A manually carried harvester as set forth in claim 7, wherein
(a) said handle means comprises an end handle and a substantially mid-length handle mounted on said frame,
(b) adjustable means in said mid-length handle for varying the length of said handle to facilitate use of the harvester by different height people, and
(c) means for anchoring said mid-length handle in adjusted position.

16. A manually carried harvester as set forth in claim 1, wherein
(a) there is a shoulder strap connected to said frame substantially mid-length of same for use in supporting a substantial portion of the weight of said harvester.

17. A manually carried harvester as set forth in claim 16, wherein
(a) there is a pair of legs foldably mounted on said frame above mid-length of said frame for supporting said harvester between times of use, and
(b) means to hold said legs in folded position alongside said frame between times of use.

18. A manually carried harvester as set forth in claim 7, wherein
(a) there is a shoulder strap connected to said frame substantially mid-length of same for use in supporting a substantial portion of the weight of said harvester.

19. A manually carried harvester as set forth in claim 18, wherein
(a) there is a pair of legs foldably mounted on said frame above mid-length of said frame for supporting said harvester between times of use, and (b) means to hold said legs in folded position alongside said frame between times of use.

20. A manually carried harvester as set forth in claim 7, wherein
 (a) there is a shoulder strap connected to said frame substantially mid-length of same for use in supporting a substantial portion of the weight of said harvester,
 (b) there is a pair of legs foldably mounted on said frame above mid-length of said frame for supporting said harvester between times of use, and
 (c) means to hold said legs in folded position alongside said frame between times of use.

References Cited

UNITED STATES PATENTS

| 1,366,001 | 1/1921 | Hurd | 56—327 |
| 1,833,246 | 11/1931 | Finocchiaro | 56—233 |
| 2,417,500 | 3/1947 | Jackson | 56—327A |
| 3,453,732 | 7/1969 | Wilkin | 30—296 |

FOREIGN PATENTS

| 195,832 | 2/1908 | Germany. |

LOUIS G. MANCENE, Primary Examiner

J. N. ESKOVITZ, Assistant Examiner

U.S. Cl. X.R.

30—124, 296; 56—153